Dec. 2, 1941.  E. P. GOSLING  2,264,901
FRICTION MEMBER AND MANUFACTURE THEREOF
Filed May 19, 1939
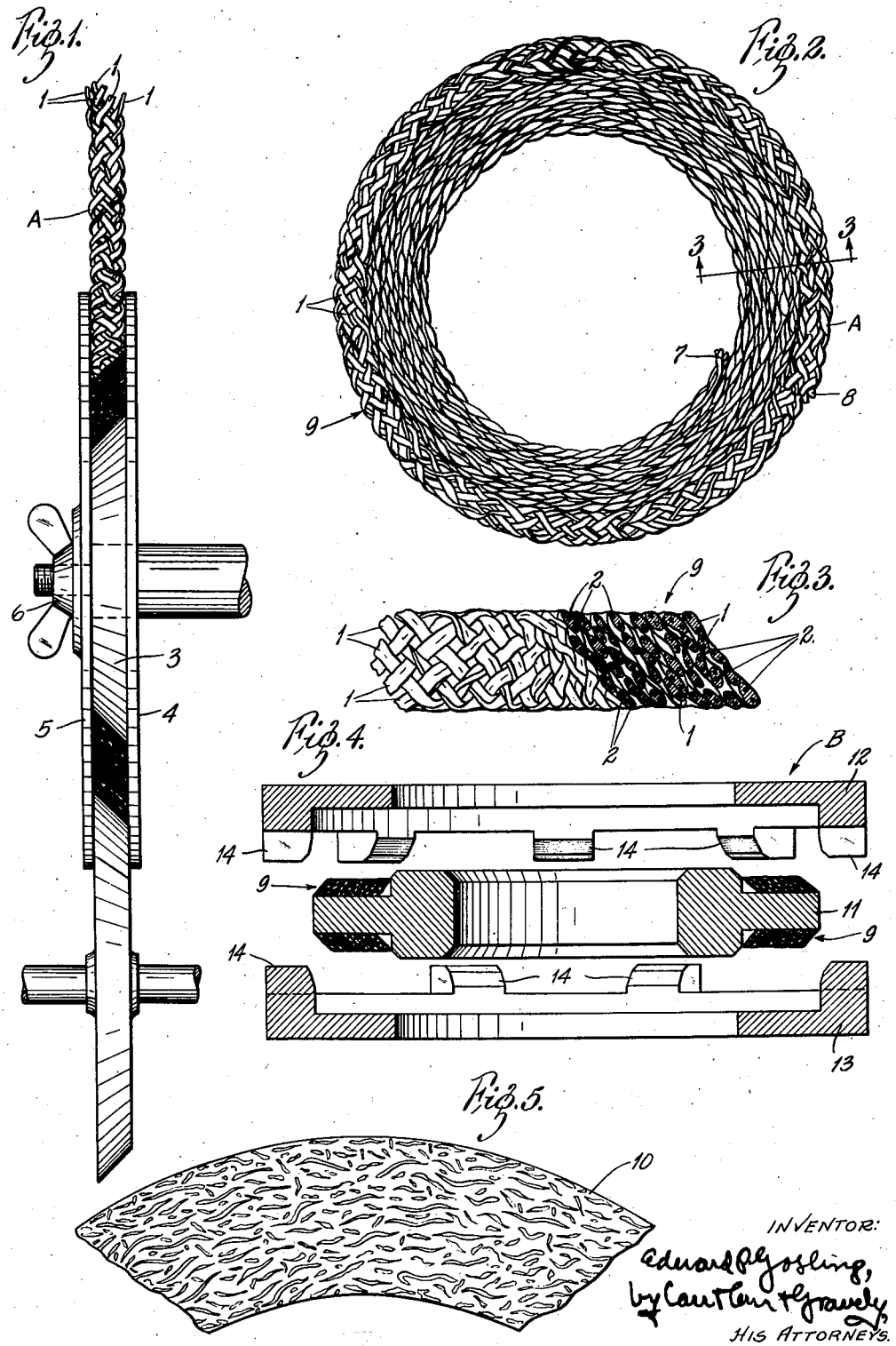
INVENTOR:
Edward P. Gosling,
by Caulter & Gravely
HIS ATTORNEYS.

Patented Dec. 2, 1941

2,264,901

UNITED STATES PATENT OFFICE 2,264,901

FRICTION MEMBER AND MANUFACTURE THEREOF

Edward P. Gosling, St. Louis, Mo., assignor, by mesne assignments, to General Motors Corporation, Detroit, Mich., a corporation of Delaware Application May 19, 1939, Serial No. 274,536

8 Claims. (Cl. 96—25)

My invention relates to improvements in annular endless friction members for clutches and brakes and the manufacture thereof, particularly to automobile clutch facings and their manufacture. The principal objects of the invention are an improved annular friction facing which is economical in the use of materials, which is free from cleavage planes, which presents to the cooperating clutch member a surface having the same proportions of the various constituent parts, throughout the life, which is free from a fiber or strand pattern so regular that it would cause scoring or excessive wear of said cooperating clutch member, and wherein the several constituent parts of the initial layers are thoroughly interlaced and interlocked, to facilitate and simplify the manufacture of such facings and to provide an improved apparatus for compressing the braid of which the facing is made into an annular ring or disk. Other objects and advantages of the invention will appear hereinafter.

The invention consists principally in a friction disk made from an irregular loosely braided strip instead of the customary woven strip of regular pattern. The invention further consists in coiling such a strip into frusto-conical form and compressing the same axially to form the friction disk. The invention further consists in the process, in the friction disk, in the apparatus and in the parts and combinations and arrangements of parts hereinafter described and claimed.

In the accompanying drawing, wherein like reference characters indicate like parts wherever they occur, Fig. 1 is an elevation of a mandrel for winding the braided strip from which the facing is formed, the facing being shown in section, Fig. 2 is an end view of the frusto-conical coiled braid, Fig. 3 is a sectional view on the line 3—3 in Fig. 2, on an enlarged scale, Fig. 4 is a diagrammatic view of the press for compressing the coiled braid into annular disk form; and Fig. 5 is a plan view of a portion of the finished friction facing.

Instead of the woven strip commonly used in the manufacture of annular friction facings, I employ a strip A of irregular loosely braided material, the drawing illustrating a braid made from five strands 1 of material. Said braid is preferably loosely and irregularly woven, so as to produce variations in the width of the braid and in the tightness of the braiding, that is in the spacing between individual strands at various points.

The individual strands are of any composition suitable for use in the manufacture of friction facings, such as automatic clutch facings, brake disks or the like. In the drawing, each strand is shown as comprising two wires 2 of brass or other metal commonly used for such purposes, said wires being wound with cotton-asbestos yarn. The cotton-asbestos-wire yarn thus formed is treated in any suitable way to produce a coated or impregnated friction material, as by running it through a bath of binder cement to impregnate the yarn therewith or by calendering. Said binder cement may be any of the types commonly used, such as rubber, synthetic resin, a drying oil, or a combination of a drying oil, cut by a suitable solvent, or any combination of binders with curing agents and filler compounds in solution or suspension. The yarn is preferably impregnated with cement in a constant ratio, that is the relation between the yarn and the impregnating material is kept constant throughout. It will be understood that the composition of the yarn and the method of impregnating the same with a binder are not parts of the present invention.

The braided strip A is wound upon a conical mandrel 3 which has a fixed side flange 4 and a removable side flange 5 held in position, as by means of a wing nut 6. The conicity of the mandrel is selected so as to provide the maximum overlapping of the several layers of braid. The angle should be as acute as possible, a 45° angle having been found satisfactory. Preferably the length of the braid is such that the two ends 7, 8 are adjacent to each other in the coil.

The coiled braid 9 is taken from the mandrel and placed in a press B where it is subjected to pressure sufficient to compress the coiled braid into annular disk form 10, said pressure being applied endwise or axially of the coil. Sufficient heat is applied to fuse or render plastic the bonding material. Heat and pressure are sufficient to fill up the void spaces and bring about a thorough interlocking and interlacing of the several strands of the braid.

After the pressing operation, the ring 10 is heated to a temperature high enough to render the binder infusible in service and the friction facing is then ground and finished and once more heated to a still higher temperature to insure stability of the finished facing.

Fig. 4 diagrammatically illustrates a preferred press, wherein two coils 9 are simultaneously compressed into friction rings 10. The press comprises a central die member 11, an upper ram member 12 and a lower ram member 13. The upper ram member 12 and the lower ram member 13 have lugs 14 around their peripheries which fit over the outer periphery of the die member 11, the working stroke of the parts being determined by the amount of material in the mold.

The above described friction facing has important advantages. As will readily appear from Fig. 5, the irregular braiding of the yarn, followed by the conical coiling and axial pressure on the coil, results in a finished facing wherein the strands of the braid are thoroughly scrambled, that is, they are disposed entirely at random, making an extremely irregular arrangement and avoiding the regular strand pattern that is characteristic of facings made of woven fabric. This scrambled arrangement avoids scoring and excess wear of the cooperating metal or other friction member due to the fact that the wearing surface is exposed to alternate compound, wire and yarn. It has the further advantage of making the surface of the friction facing present substantially the same ratio of constituent parts, regardless of wear, as distinguished from friction facings of regular pattern, wherein there is an excessive amount of binder presented to the friction member at first and more and more amounts of metal and cloth as the facing wears. The crossing of the braided strands over the entire width of the facing increases the strength thereof, particularly when drilled in the conventional manner, because it is necessary to drill through several layers of braid.

By varying the composition of the yarn, changing the binder cement, using more or fewer wires and more or fewer strands, and varying the regularity and tightness of the braiding, friction facings of any desired characteristics can be formed. In any case, the braded material, conically wound and compressed axially or endwise results in a friction facing wherein the individual strands are thoroughly interlaced and interlocked with each other, wherein there is no regular pattern, but a completely scrambled or random arrangement of strands and wherein there is a uniform ratio of the constituent parts throughout the entire facing.

What I claim is:

1. The steps in the method of making an annular friction facing, comprising: forming a flat braid of loosely interlaced strands of material, winding said loose braid into a rough annular form in such manner that the successive turns of said flat braid form interfitting cone-shaped layers, then molding said annular form into a substantially solid annulus by such high pressure upon the lateral faces of said annular form as to force a substantial interlocking arrangement between the originally loose strands of the adjacent cone-shaped layers.

2. The steps in the method of making an annular friction facing, comprising: forming a flat braid of loosely interlaced strands of material, coiling said flat braid into an annular form in such manner that successive turns thereof form spiral cone-shaped layers, then molding said annular form into a substantially solid annulus by applying such high pressure upon the opposed faces of said form as to cause an irregular scrambling together of said loosely braided strands in the final molded annulus.

3. The steps in the method of making an annular friction facing, comprising: forming a flat braid of loosely interlaced strands of material, coiling said flat braid into an annular form in such manner that successive turns thereof form spiral cone-shaped layers, then molding said annular form into a substantially solid annulus by applying high pressure upon the opposed lateral edges of said conical layers of loose braid and thereby causing an irregular interlocking arrangement between said conical layers in the final molded annulus.

4. The steps in the method of making an annular friction facing, comprising: forming a flat braid of loosely interlaced strands of fibrous material impregnated with a moldable binder material, coiling said impregnated loose braid into a relatively non-solid annular form in such manner that successive turns of said loose braid form interfitting cone-shaped layers, then molding said non-solid annular form into a substantially solid annulus by applying high molding pressure upon the opposed faces of said form.

5. The steps in the method of making an annular friction facing, comprising: forming a flat braid of loosely interlaced strands of cotton-asbestos-wire yarn impregnated with a moldable binder material, winding said loose impregnated braid into a rough annular form so that successive turns of said loose braid provide successive cone-shaped layers, then molding said rough annular form into a substantially solid annulus by applying high pressure upon the opposed annular faces of said form.

6. The steps in the method of making an annular friction facing, comprising: forming a flat braid of loosely interlaced strands of material, said strands being previously uniformly impregnated along their length with a moldable binder material at a substantially constant ratio of binder material to other braid material, coiling said impregnated loose braid into a rough annular form in such manner that successive turns of said braid provide interfitting cone-shaped layers, then molding said annular form into a substantially solid mass by applying high pressure upon the opposed annular faces of said form.

7. A clutch friction disk comprising a peripherally coiled flat braid of loosely intertwined strands of fibrous material and a heat-resisting moldable binder material all molded together under heat and pressure and forming a highly compacted solid disk, said flat braid having a materially greater width than thickness and being coiled in such manner that successive turns of said flat braid mutually overlap one another in a radial direction of said disk for a distance at least equal to half the width of said braid, whereby the successive turns of said flat braid are positively forced into a strong radially overlapping relationship in the final molded disk.

8. A clutch friction disk comprising a peripherally coiled flat braid of loosely intertwined strands of fibrous material and a heat-resisting moldable binder material all molded together under heat and pressure and forming a highly compacted solid disk, said flat braid having a materially greater width than thickness and being coiled in such manner that the wider dimension of said braid extends at a substantial angle to the plane of said disk, whereby the adjacent turns of said coiled flat braid are forced into a positive overlapping and interlocking relationship in the molded disk.

EDWARD P. GOSLING.